United States Patent [19]

Palmer

[11] Patent Number: 5,381,222
[45] Date of Patent: Jan. 10, 1995

[54] METHOD OF REMOTE SENSING OF OCEAN SURFACE CURRENTS

[75] Inventor: A. Jay Palmer, Longmont, Colo.

[73] Assignee: The United States of America as represented by the Department of Commerce, Washington, D.C.

[21] Appl. No.: 65,007

[22] Filed: May 24, 1993

Related U.S. Application Data

[63] Continuation-in-part of Ser. No. 886,216, May 20, 1992, Pat. No. 5,221,927.

[51] Int. Cl.$^6$ .............................................. G01C 3/08
[52] U.S. Cl. ................................................... 356/4
[58] Field of Search ........................ 356/4, 5; 342/26

[56] References Cited

U.S. PATENT DOCUMENTS

| | | |
|---|---|---|
| 4,053,886 | 10/1977 | Wright et al. . |
| 4,054,879 | 10/1977 | Wright et al. . |
| 4,172,255 | 10/1979 | Barrick et al. . |
| 4,182,570 | 1/1980 | Courrier et al. . |
| 4,509,048 | 4/1985 | Jain . |
| 4,633,255 | 12/1986 | Trizna ............................ 342/26 X |
| 4,963,024 | 10/1990 | Ulich ............................... 356/5 X |
| 4,996,533 | 2/1991 | May et al. . |
| 5,006,721 | 4/1991 | Cameron et al. . |
| 5,034,810 | 7/1991 | Keeler . |
| 5,221,927 | 6/1993 | Palmer ............................. 356/5 X |

OTHER PUBLICATIONS

W. J. Plant and D. L. Schuler, "Remote sensing of the sea surface using one- and two-frequency microwave techniques," *Radio Sci.*, 15, 605–615 (1980).

A. J. Palmer, "Surface current mapping performance of bistatic and monostatic k-radars", J. Geosc. and Remote Sensing 1991.

W. L. Eberhard and R. M. Schotland, "Dual-frequency doppler-lidar method of wind measurement," *Appl. Opt.*, 19, 2967–2976 (1980).

*Primary Examiner*—Mark Hellner
*Attorney, Agent, or Firm*—Henderson & Sturm

[57] ABSTRACT

A method of remote sensing of water surfaces using laser beams of slightly differing frequencies. Laser radiation scattered from the water surface is collected and processed to determine the surface gravity wave and capillary wave spectrum and surface currents. Maps may be constructed using either land-based or airborne Δk-lidar stations.

10 Claims, 1 Drawing Sheet

5,381,222

METHOD OF REMOTE SENSING OF OCEAN SURFACE CURRENTS

CROSS REFERENCE TO RELATED APPLICATIONS

The present application is a continuation-in-part of copending U.S. application Ser. No. 07/886,216, filed May 20, 1992, by Allan Jay Palmer, entitled: "Lidar-Acoustic Sounding of the Atmosphere", which application is incorporated herein by reference.

TECHNICAL FIELD

This invention relates to remote sensing of a water surface, and more particularly to a method of remote sensing of surface gravity waves, capillary waves, and surface currents using laser radiation sources.

BACKGROUND ART

Various methods have been employed for remote sensing of surface gravity waves on large bodies of water. For example, $\Delta$k-radar sensing of surface gravity waves is an established technology as described by W. J. Plant and D. L. Schuler, "Remote sensing of the sea surface using one-and two-frequency microwave techniques", *Radio Sci.*, 15, 605–615 (1980), which is incorporated herein by reference. $\Delta$k-radar sensing, however, often requires a long dwell time and an impractically large receiver aperture.

Those concerned with these and other problems recognize the need for an improved method for remote sensing of water surfaces.

DISCLOSURE OF THE INVENTION

The present invention provides a method of remote sensing of water surfaces using laser beams of slightly differing frequencies. Laser radiation scattered from the water surface is collected and processed to determine the surface gravity wave spectrum and surface currents. Maps may be constructed using either land-based or airborne $\Delta$k-lidar stations.

An object of the present invention is the provision of an improved method of remote sensing of a water surface.

Another object is to provide a method that is useful in determining the surface gravity wave spectrum of a water surface.

A further object of the invention is the provision of a method that is useful for determining the surface current of a water surface.

Still another object is to provide a method of mapping a water surface from two or more land-based stations.

A still further object of the present invention is the provision of a method of mapping a water surface from a single airborne station.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
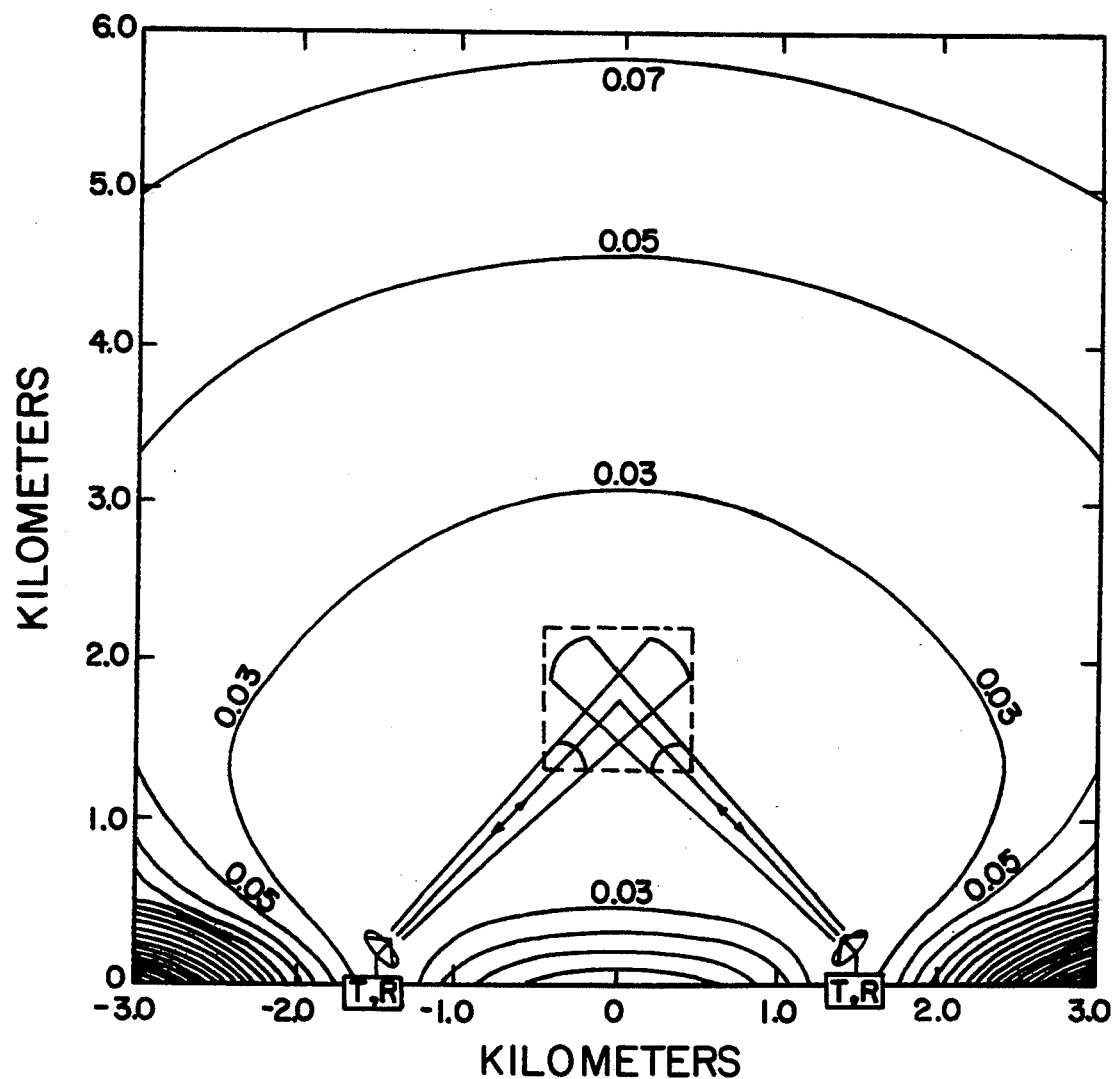
FIG. 1 is a contour map of achievable surface current measurement resolutions in meters per second for specified lidar parameters and surface conditions.

This invention puts forward a new technique for remote sensing of surface gravity waves on large bodies of water. The technique is analogous to $\Delta$k-radar sensing of surface gravity waves which is an established technology. The principle difference is that laser beams are used instead of radar beams. The principle advantage of the $\Delta$k-lidar technique is a large increase in the signal-to-noise ratio (SNR) over that of $\Delta$k-radar.

The basic principal of operation of the invention is the same as that of $\Delta$k-radar. Two laser beams of slightly different frequencies are used to illuminate a patch of ocean surface from either a land-based or airborne platform. The laser radiation scattered from the surface is collected and the two-frequency components of the scattered radiation are multiplied together. The low-frequency component of this product is the basic $\Delta$k-lidar signal. Its power spectrum will contain a resonant peak at the frequency of the surface gravity wave present on the surface whose wavenumber is equal to twice the surface projected wavenumber difference of the two laser beams. The amplitude and frequency of this resonance peak contain useful information about the surface. The amplitude spectrum of the peak gives the surface gravity wave spectrum present on the surface and its frequency gives the surface current along the look direction of the lidar. For land-based lidars, maps of the surface wave spectrum or surface current can be constructed by using two or more $\Delta$k-lidar stations in either a monostatic or bistatic mode. (See A. J. Palmer "Surface current mapping performance of bistatic and monostatic $\Delta$k-radars" J. Geosc. and Remote Sensing 1991, incorporated herein by reference.) Airborne systems can construct such maps using a single system.

The increased SNR of the $\Delta$k-lidar over $\Delta$k-radar is due primarily to the ability to aperture-average the speckle noise of the scattered radiation. This noise is referred to as clutter noise in $\Delta$k-radar sensing. It is the fluctuations of the signal caused by random motion of the scattering centers. In the case of $\Delta$-radar, this noise must be averaged out temporally, i.e. a number of statistically independent spectra are collected at different times, sometimes using different frequencies, and averaged. This often requires an undesirable long dwell time for the radar on each illuminated patch of the surface. A large number of statistically independent spectra are actually present in just one received pulse train if it were collected in a large enough receiver aperture. In the case of $\Delta$k-radar, the required aperture size is far to large to be practical. In the case of $\Delta$k-lidar, because of the reduced diffractive spreading, a receiver aperture of one meter is large enough to contain on the order of a million speckle zones, each of which contains a statistically independent field product spectrum. The spatial averaging of the signal which takes place as a result of collecting the signal over an extended aperture improves the SNR by a factor of the square root of the number of speckle zones captured by the receiver aperture.

The greater speckle noise bandwidth of a $\Delta$k-lidar also contributes to an improved SNR over that of a $\Delta$k-radar. The combined improvement in SNR of a 1 um wavelength $\Delta$k-lidar over that of a 3 cm wavelength $\Delta$k-radar is about a factor of $10^4$ assuming that the scattered laser radiation is collected through a 1 meter diameter aperture. It is necessary to employ a direct detection lidar system as opposed to a coherent detection lidar in order to utilize the described aperture averaging technique.

The most important performance improvement of a Δk-lidar surface current mapping system which results from the improved SNR is a reduced dwell time. This occurs primarily because shorter wavelength gravity waves can be chosen for observation. The amplitude spectrum of gravity waves typically falls off as the fourth power of their wavelength and this requires the Δk-radar systems to observe swells with wavelengths in the tens of meters range in order to maintain an adequate SNR for detecting the Δk resonance line. If a Phillips spectrum for the gravity waves is assumed as before, and a similar modulation transfer function, then the improved SNR of a Δk-lidar should allow surface wave wavelengths as short as few centimeters (requiring a frequency separation of the two lidar beams of a few hundred MHz.)

Calculations have demonstrated that the current mapping performance exhibited in FIG. 1 could be achieved with Δk-lidar using a 1 second dwell time per 100 meter range resolution element. This contrasts with the 1.5 minute dwell time required to achieve the same performance with a Δk-radar. The lidar and ocean surface parameters used for calculating the velocity resolution shown in FIG. 1 are listed in Table 1.

TABLE 1

Lidar and ocean surface parameters used for calculating the velocity resolution contours in FIG. 1

| Lidar Parameters | |
| --- | --- |
| Beam width | 0.8° |
| Difference frequency | 500 MHz |
| Pulse Repetition frequency | 1 kHz |
| Height above surface | >50 m |
| Number of spectra averaged (temporally) | 1 |
| Range resolution | 100 m |
| Dwell time per spectrum | 1 sec |
| Ocean Surface Parameters | |
| Modulation transfer function | 13 |
| Surface wave amplitude spectrum | $.05/K_{sw}^4$ |
| Speckle noise bandwidth | 1 MHz |

The required frequency separation of the two lidar beams could be accomplished by using separate longitudinal laser modes or through acousto-optic modulation of the laser radiation. Indeed, acousto-optic modulation of an Argon laser has previously been used to construct an incoherent dual-frequency lidar to measure flow velocities in the laboratory (See W. L. Eberhard and R. M. Schotland, "Duel-frequency doppler-lidar method of wind measurement", Appl. Opt., 19, 2967–2976 (1980).) in a technique unrelated to the Δk-lidar technique discussed here.

The Δk-lidar technique disclosed above is related to a recently disclosed lidar-acoustic sounding technique for the atmosphere. In the later technique, the role of the surface gravity wave is replaced by an acoustic wave in the atmosphere.

Thus, it can be seen that at least all of the stated objectives have been achieved.

Obviously many modifications and variations of the present invention are possible in light of the above teachings. It is therefore to be understood that, within the scope of the appended claims, the invention may be practiced otherwise than as specifically described.

I claim:

1. A method of remote sensing of a water surface with increased signal to noise ratio and reduced dwell time, comprising the steps of:

illuminating a section of water surface with a first laser radiation source having a first frequency;

illuminating the section of water surface with a second laser radiation source having a second frequency distinct from the first frequency;

collecting laser radiation from the first and second laser sources scattered from the section of water surface, the scattered radiation including first and second-frequency components;

multiplying the first and second frequency components of the scattered radiation to obtain a product having a low frequency component;

determining the power spectrum of the low frequency component of the product, said power spectrum having a resonant peak at a frequency of the surface waves present on the section of water surface; and determining an amplitude and a frequency of the resonance peak to determine a surface gravity wave spectrum and a surface current along a look direction at the first and second radiation sources.

2. The method of claim 1, further including the steps of:

locating the first and second laser radiation sources at a plurality of distinct positions with respect to the section of water surface; and mapping the surface wave spectrum for the section of water surface.

3. The method of claim 1, further including the steps of:

locating the first and second laser radiation sources of at a plurality of distinct positions with respect to the section of water surface; and mapping the surface current for the section of water surface.

4. The method of claim 2 wherein a pair of the first and second laser radiation sources is located at two distinct land-based stations.

5. The method of claim 3 wherein a pair of the first and second laser radiation sources is located at two distinct land-based stations.

6. The method of claim 2 wherein a pair of the first and second laser radiation sources is included in a single airborne system.

7. The method of claim 3 wherein a pair of the first and second laser radiation sources is included in a single airborne system.

8. The method of claim 1 further including the step of:

applying an aperture averaging technique while employing a direct detection lidar system.

9. The method of claim 1 wherein the first and second frequency distinction is accomplished by using separate longitudinal laser modes.

10. The method of claim 1 wherein the first and second frequency distinction is accomplished by using acousto-optic modulation of laser radiation.

* * * * *